(12) United States Patent
Chernock et al.

(10) Patent No.: US 6,229,524 B1
(45) Date of Patent: May 8, 2001

(54) USER INTERFACE FOR INTERACTION WITH VIDEO

(75) Inventors: Richard Steven Chernock, Newtown, CT (US); Frank Andre Schaffa, Hartsdale; David Israel Seidman, NewYork, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/118,523

(22) Filed: Jul. 17, 1998

(51) Int. Cl.⁷ ............................................. G09G 5/08
(52) U.S. Cl. .................. 345/157; 345/146; 345/348; 345/352
(58) Field of Search .................... 345/348, 349, 345/352, 353, 354, 357, 146, 157, 160; 709/201; 725/109, 110, 112, 113, 133, 141, 153

(56) References Cited

U.S. PATENT DOCUMENTS

| | | | |
|---|---|---|---|
| 5,077,607 | * 12/1991 | Johnson et al. | 348/13 |
| 5,100,386 | * 3/1992 | Inoue | 604/103 |
| 5,146,556 | * 9/1992 | Hullot et al. | 345/348 |
| 5,508,815 | * 4/1996 | Levine | 386/83 |
| 5,515,495 | * 5/1996 | Ikemoto | 345/342 |
| 5,517,254 | * 5/1996 | Monta et al. | 348/569 |
| 5,517,257 | * 5/1996 | Dunn et al. | 348/734 |
| 5,559,459 | * 9/1996 | Back et al. | 326/93 |
| 5,568,272 | * 10/1996 | Levine | 386/48 |
| 5,648,824 | * 7/1997 | Dunn et al. | 348/734 |
| 5,659,335 | * 8/1997 | Partridge | 345/157 |
| 5,678,041 | * 10/1997 | Baker et al. | 707/9 |
| 5,708,845 | * 1/1998 | Wistendahl et al. | 395/806 |
| 5,734,853 | * 3/1998 | Hendricks et al. | 345/352 |
| 5,796,952 | * 8/1998 | Davis et al. | 395/200.54 |
| 5,839,112 | * 11/1998 | Schreitmueller et al. | 705/4 |
| 5,929,349 | * 7/1999 | Kikinis | 345/327 |
| 5,974,201 | * 1/1999 | Chang et al. | 382/305 |
| 5,977,964 | * 11/1999 | Williams et al. | 345/327 |
| 6,006,265 | * 12/1999 | Rangan et al. | 709/226 |
| 6,012,051 | * 1/2000 | Sammon et al. | 706/52 |
| 6,044,403 | * 3/2000 | Gerszberg et al. | 709/225 |
| 6,052,714 | * 4/2000 | Miike et al. | 709/217 |
| 6,070,167 | * 5/2000 | Qian et al. | 707/102 |

* cited by examiner

Primary Examiner—Ba Huynh
(74) Attorney, Agent, or Firm—Scully, Scott, Murphy & Presser; Douglas M. Cameron, Esq.

(57) ABSTRACT

A user interface is presented for the interaction, by a viewer, with the content of a multi media presentation and functions related to this content. The user interface enables the navigation, by a viewer, among dynamic selectable regions (hot spots) within a multi media presentation. These hot spots are defined prior to the video's presentation, and are used to allow the viewer to invoke functions associated with the multi media presentation. The user interface allows the viewer to move from one hot spot to another with a simple interface, such as a tab key on a remote control. The user interface constrains the possible locations of an on-screen cursor to the hot spot locations. Properties of the hot spots, such as priority, region size, and display parameters are modifiable and customizable by the viewers's system automatically or through interaction with the viewer.

17 Claims, 3 Drawing Sheets

USER INTERFACE FOR INTERACTION WITH VIDEO

BACKGROUND OF THE INVENTION

1. Field of the Invention

The field of art to which this invention relates is broadcast television or on-demand transmission of video/audio presentation. It is more particularly directed to a user interface for interaction with supplementary information embedded with a video stream and delivered to a television set in a single transport.

2. Description of Prior Art

The distribution of supplementary information, presented and accessed in the context of viewing of a video program, was described in a commonly owned co-pending U.S. patent application Ser. No. 08/888,574. The supplementary information is distributed to users, connected to a digital broadcast medium. This supplementary, or "follow-up" information may take the form of video, audio or text, and is embedded as digital signal in the same transport stream as the original digital video and audio signal. Alternatively, the transport stream may carry pointers to follow-up information instead of the information itself. In this case, the pointers are saved and used subsequently in the selection of "follow-up" information from the channel which carries supplementary data exclusively.

Similarly, a system enabling the insertion of supplementary data into digital video streams, is described in a commonly owned co-pending U.S. patent application Ser. No. 09/032,491. As described, an editor annotates a video stream with content which is related to objects appearing in that video stream. The editing process is facilitated by the automatic marking and data association of some regions in the video. This automation utilizes interpolation between marked "end points" specified by the editor, as well as the recall of "scene contexts", i.e., the markings of previously edited scenes which recur in the video. Finally, a co-pending U.S. patent application Ser. No. 08/968,404 describes a two-way digital multimedia broadcast service utilizing embedded control and supplementary data in the context of interactive applications, including navigation from one video program to another by selection of objects in the current video; creation and transmission of records of user viewing habits and interaction histories; iterative video-based data search and retrieval; dynamic customization of coordination between video and data content of the broadcast stream; and the dynamic creation of "personalized" programs by the user, through the broadcast and selection of overlapping program segments which are themselves customized for a particular user or group of users.

A capability is required which allows selectable regions to be dynamic, and to have an ability to change location and other properties as the multi media presentation progresses. The display modality, such as an on-screen cursor or an icon, which indicates the selectable region, should change location together with the object in the selectable region.

Using a free-floating cursor which can be positioned at any screen location to point to arbitrary screen regions is common in the personal computer (PC) environment. TV viewers, the majority of whom do not own PC's and lack familiarity with them, do not have the opportunity to acquire skills necessary for manipulating a free-floating cursor. Thus, pointing methods in the TV environment that require use of a free-floating cursor would require considerable viewer training and coordination, and would discourage viewers from using the system.

In personal computer technology, the use of an on-screen cursor which is moved by tabbing and is used for the selection of various on-screen options is well known. U.S. Pat. Nos. 5,678,041, 5,515,495, 5,146,556, and 5,659,335 describe implementations of on-screen cursors used in this way. All these systems involve a static display of graphics and/or icons on a PC screen.

U.S. Pat. No. 5,077,607 describes the use of tabbing selected on-screen areas having textual information e.g., teletext, or alphanumeric information displayed on a television screen for the selection of various functions, such as on-line banking. Teletext is typically implemented with a dumb standalone terminal device or with a device attached to or built into a standard television. A keyboard may be used as the user input device. Options are displayed on-screen using the graphics capability of the attached or built-in device and are navigated via tabbing before being selected.

In the context of analog or digital video signal display, many patents, such as U.S. Pat. Nos. 5,568,272, 5,508,815, 5,517,254, 5,734,853, and 5,559,459 describe an on-screen graphics menu enabling selection and navigation of an electronic program guide. The user is presented with a static screen display having a menu of programs, and navigates through the menu by scrolling or jumping to different screens, and finally selecting a program to view. In these systems, the selection of menu items is strictly on the graphics screen(s) and no selections are offered once the video is playing. One feature is provided however, whereby the menu is recalled and superimposed over the playing video. In this case, the menu content and the video content are independently generated and transported on different streams, and there is no meaningful coordination between video content and the superimposed graphics.

U.S. Pat. Nos. 5,517,257, 5,648,824, and 5,100,386 describe systems utilizing on-screen graphics for the control of video functions, such as pausing and rewinding of an ongoing video in a video-on-demand transmission or in an interactive television scenario. In these systems functions are offered to the viewer via an on-screen graphics representation e.g., of a remote control unit or control buttons of a camera. As an example, these on-screen representations enable user selection of a display viewing angle from among a choice of viewing angles. A remote control unit may be used as the user input device. Again, the functions offered graphically on-screen are not related to the content of the video which is being played.

Despite considerable viewer interest in video applications, including interactive and multimedia applications, such as those related to home shopping, most viewers will be discouraged by a navigation and selection method which requires more than a point-and-select approach. On-screen text displays, such as the menus presented to the viewer in an electronic program guide (EPG), allow the viewer, using a very simple interface, to jump from one option to another and make a selection. No corresponding system exists for video content-related options in a broadcast or in an on-demand multi media presentation (MMP). Moreover, in a MMP, because objects are moving, a user interface which allows only fixed screen regions to be selectable is insufficient.

Thus it would be highly desirable to provide an interface which allows viewers to navigate among selectable screen regions (hot spots) associated with objects contained in a multi media presentation, and to invoke functions and/or supply information relating to the selected object.

SUMMARY OF THE INVENTION

The method of the present invention allows a viewer, using a simple interface, to navigate a cursor among the current hot spots in a MMP and make a selection of a function associated with one of them. Hot spots are selectable regions in a MMP and may be, though not necessarily, related to objects appearing in the MMP. The use of hot spots constrains the cursor to a small number of screen locations simplifying the user interface. Hot spots are dynamic, their presence, location, and other properties, such as priority and associated function, can be a function of the authoring party, the viewer's actions, or the viewer's profile.

Prior to the MMP, an authoring stage must occur, during which raw video content is coordinated with embedded information indicating the presence, the location, and the time of hot spots. The hot spot information may be embedded with the MMP in a single transport such as an MPEG-2 Transport Stream or it may be carried separately from the MMP.

After initial hot spot properties are defined and associated with or embedded in the MMP, according to the principles of the invention, the MMP is delivered to a viewer's display device, which performs the following events: extracting and parsing initial hot spot information; modifying hot spot properties in accordance with viewer's profile and/or preferences; displaying hot spots and video to the viewer; allowing the viewer to navigate among hot spots, thereby changing on-screen cursor location; and invoking a function associated with a hot spot.

A viewer can select whether or not he wishes to view hot spots during the MMP. The properties of these hot spots can be modified by the viewer's profile, or on the basis of the viewer's actions. For example, if the viewer has recently interacted with the system to request information concerning a particular topic, such as real estate, future hot spots relating to this topic may be displayed prominently. These hot spot properties can be modified dynamically throughout the viewing of a MMP. Also, the properties can be changed anytime via the viewer's profile and/or viewer/system interaction.

If the viewer has selected to view hot spots, during the scenes in which hot spots are present, a default hot spot, as set by the authoring system, will be displayed. The viewer can jump from one hot spot to another using a simple interface, such as a "tab" key on a remote control. In response to the tab key, the system moves an on-screen cursor from one hot spot location to the next, cyclically, in a priority sequence as set by the authoring system.

The manipulation of such additionally embedded information is of interest in a wide range of applications, including entertainment and home shopping.

DETAILED DESCRIPTION OF THE INVENTION

Figure 2:
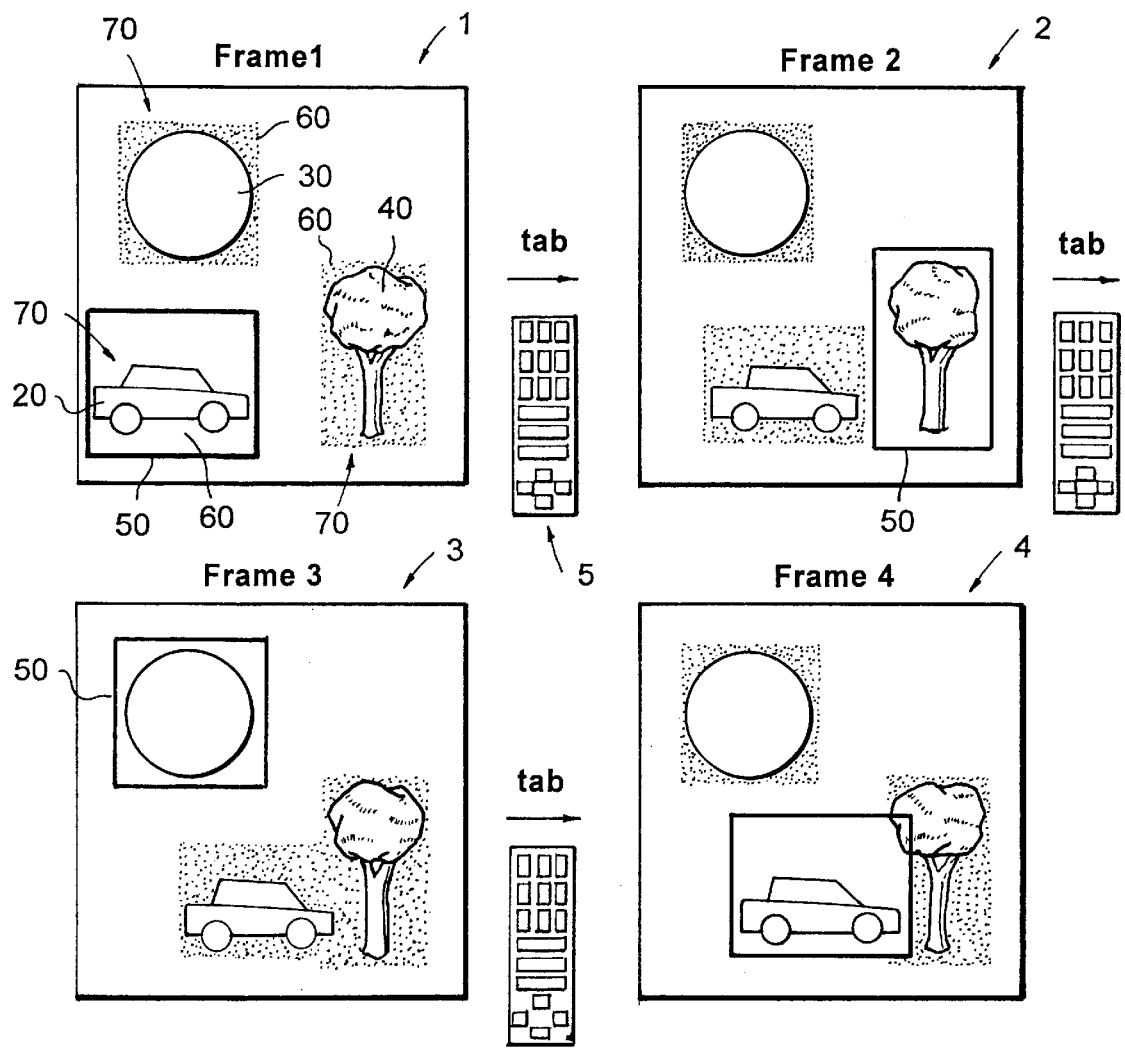
FIG. 2 is an exemplar representation of the viewer's screen as the user navigates among hot spots in a MMP which has hot spots defined.

During an authoring stage, initial hot spot properties are defined and associated with raw video content to be displayed as part of the MMP, on a user display apparatus such as a television monitor, shown in FIG. 2. Thereafter, this hot spot information indicating the presence, the location, the priority and the time of hot spots is coordinated with and embedded into the video stream forming the MMP. The means and the method for such embedding is described in a commonly owned, co-pending U.S. patent application Ser. No. 09/032,491, entitled "A Data Annotation System for Digital Video Streams", filed on Feb. 27, 1998, and commonly owned, co-pending U.S. patent application Ser. No. 08/888,574, entitled "A Scheme for the Distribution of Multimedia Follow-Up Information", filed on Jul. 7, 1997, the whole contents disclosure of which are incorporated herein by reference as is fully set forth herein. The hot spot information may be embedded with the MMP in a single transport such as an MPEG-2 Transport Stream or it may be carried separately from the MMP.

The MMP is then broadcast or transported to a viewer's display equipment. Within digital television transmission, the preferred embodiment uses MPEG-2 compression for audio and video signals, and MPEG-2 Systems transport for the transport of those signals. Because of the high bitrate requirements of digital video, a compression method is usually applied to video before transmission over a network. In the preferred embodiment, video and audio content are compressed using MPEG-2 compression, as specified in ISO/IEC 13818-2 for video and ISO/IEC 13818-3 for audio.

The MPEG-2 standard also specifies how programs consisting of audio and video elementary streams can be multiplexed together in a transport stream. This is specified in the MPEG-2 Systems Specification, ISO/IEC 13818-1. The MPEG-2 Systems Specification accommodates the inclusion in a program's transport stream of non-video and non-audio streams, by use of private data streams. All transport stream packets regardless of content are of a uniform size (188 bytes) and format. Program specific information, which is also carried in the transport stream, carries the information regarding which elementary streams have been multiplexed in the transport stream, what type of content they carry, and how they may be demultiplexed.

In the preferred embodiment of the present invention, the viewer's equipment includes a Set-Top Box (STB) or a television monitor which contains the functions of the STB. The preferred embodiment assumes that the MMP is transmitted to the STB in digital form, in another embodiment this invention is utilized in the context of analog television transmission, using the Vertical Blanking Interval to carry the hot spot information.

An example of an STB is the IBM Set-Top Box, Reference Design (ACE4033CST), comprising:
  a. an audio and video decoder (IBM CD21),
  b. a video encoder for NTSC or PAL video (Phillips 7185),
  c. an MPEG-2 demultiplexer (VLSI 2020),
  d. a processor (PowerPC 403GC, 33 MHZ), and
  e. 4 Mbytes of Random Access Memory.

This STB has been designed to provide the on-screen display (OSD) overlay functions, enabling placement of a cursor above the video to indicate the presence of hot spots. A minimum of OSD graphics capability offers 16 colors; a preferred capability offers 256 colors and multi-level blending capability.

The RAM memory is required on the STB for storing user preference information, user identification information, and other data. In the preferred embodiment 4 Mbytes of dynamic RAM storage for the entire STB, is sufficient.

A simple and inexpensive off-the-shelf remote control unit, such as the One For All Universal Remote Control URC 3065B01 can be used, in the preferred embodiment. This unit can be programmed to transmit the codes of STB's from a variety of manufacturers. The arrow keys are laid out in an intuitive manner, similar to the layout shown in FIG. 3.

Control functions within the STB can be implemented with an embedded microprocessor, such as the Intel i960 or PowerPC 403GC, and requiring an EPROM, or an EPLD, such as the Altera EPM9320. The IBM reference STB, for example, has a PowerPC 403GC microprocessor at 33 MHZ, supplying sufficient processing power for the implementation of this invention.

Figure 1:
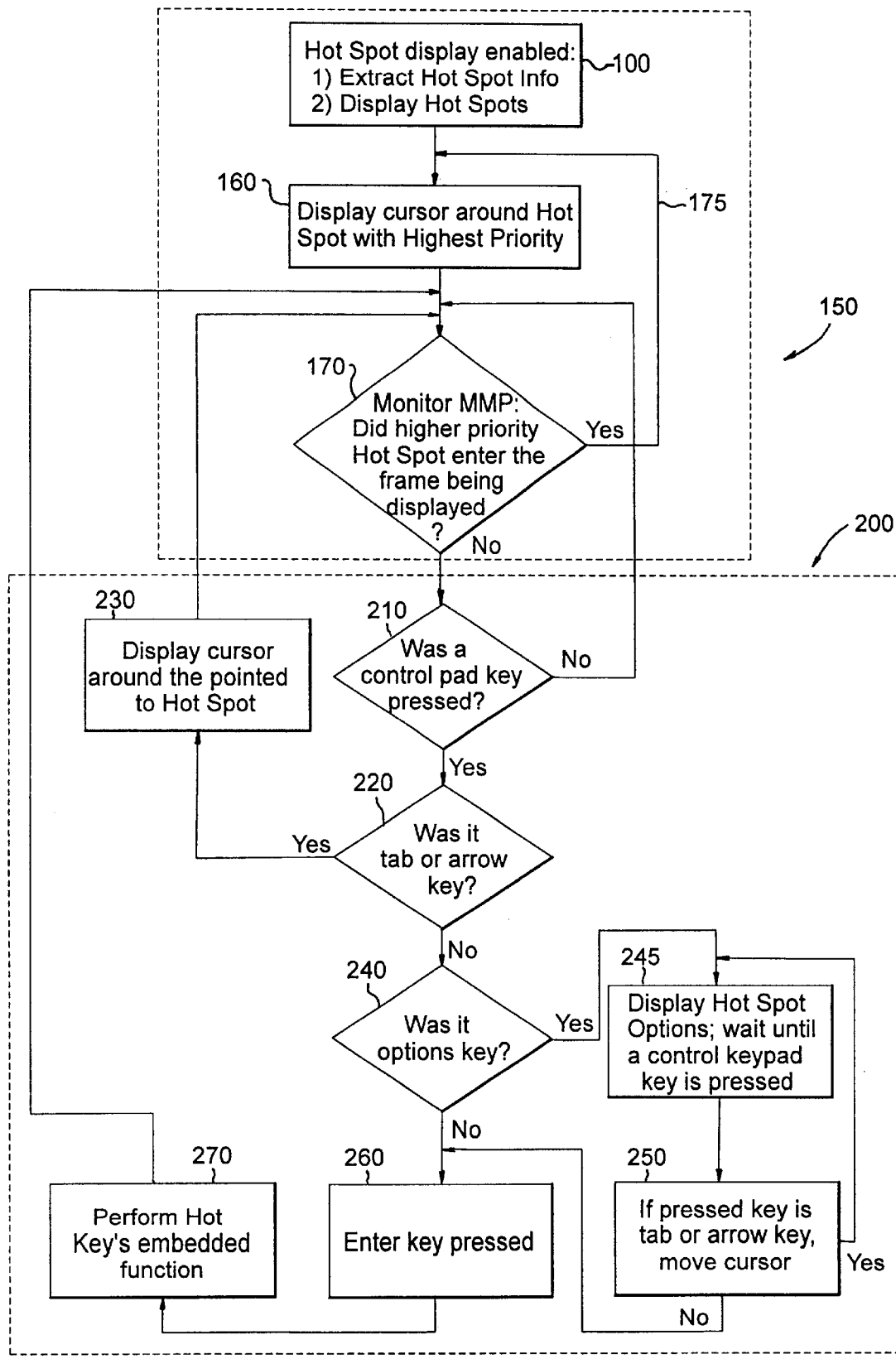
FIG. 1 is a flow diagram of a program for the STB.

FIG. 1 shows a flow diagram depicting STB control functions implemented in this invention. The STB must extract the hot spot information from the incoming stream 100 by decoding and processing the input MMP stream. As indicated by box 150, the hot spot information is managed, particularly the on-screen offering and display of information and interactions with the viewer outlined in box 200. This requires an STB microcode application that monitors the MPEG-2 private data stream(s), buffers new data, manages its start validity and end validity times, manages on-screen icons, text, and handles and executes viewer input commands via the remote control unit.

After the display of hot spots is enabled 100 the microcode monitors 170 the decoded, incoming MMP for the entry into the currently displaying frame of a hot spot with a highest priority. If such an entry is detected, the cursor is displayed around that hot spot 160 and frame monitoring 170 resumes. If a hot spot with a higher priority is not detected, a check is made of whether any control pad key was pressed 210.

If keys were not pressed the frame monitoring 170 resumes. Otherwise, if a navigation key such as a tab 6 (FIG. 3), or arrow keys 9–12 (FIG. 3) were pressed 220, the cursor is displayed to surround the pointed to hot spot 230, and monitoring 170, 210 resumes.

If an options key 8 (FIG. 3) was pressed 240, the function options of a pointed to hot spot will be displayed 245. The program then waits for the next key input to determine whether to navigate through the options 250 or to perform a selected function 270 if the enter key 7 (FIG. 3) is pressed.

If an enter key 7 (FIG. 3) is pressed, the selected hot spot function is performed 270 and monitoring 170, 210 resumes.

FIG. 2 shows a sequence of frames as an example of navigation among on-screen hot spots. In frame 1, three objects are visible, a car 20, a sun 30 and a tree 40. Each object has an associated hot spot 60, indicated in FIG. 2 by a shaded region around each object 70. Locations of the hot spots 60 associated with these objects are predefined in the authoring stage and embedded in the MMP stream.

If, as shown in FIG. 2, frame 1, the car 20 may be encoded to have the highest priority, then the STB will display the cursor 50, shown as a bold outline, to surround the car 20 by default. The shape of the cursor 50 may be optional, determined by the viewer, or pre-set by the manufacturer of the STB.

To view the hot spot 60 for the next selectable object, the viewer would press the tab key 6 (FIG. 3) located on the remote control unit 5 (FIG. 3), and the next object in the priority sequence, pre-determined during the authoring stage, e.g., the tree 40 shown in frame 2, will be surrounded by the cursor 50. Pressing the tab key 6 (FIG. 3) for a second time will move the cursor 50 to surround the sun 30, shown in frame 3. Pressing the tab key 6 (FIG. 3) again, will move the cursor 50 back, to surround the car 20, as shown in frame 4. Meanwhile, because the MMP advances, the car 20 as shown in frames 1–4, gradually changes its position relative to other objects in the frame.

The priority sequence can be entirely determined by the author at the authoring stage or by the conjunction of the information entered in the authoring stage and the information in the user's profile in the storage of the MMP receiver, i.e., the STB. It should be noted that the priority for a given object can change over time, for example, if a new character enters the scene shown in frame 1, that character may have the highest priority, bumping 170, the car 20 to the next priority position. In this case the cursor 50 will move to surround the new object.

Figure 3:
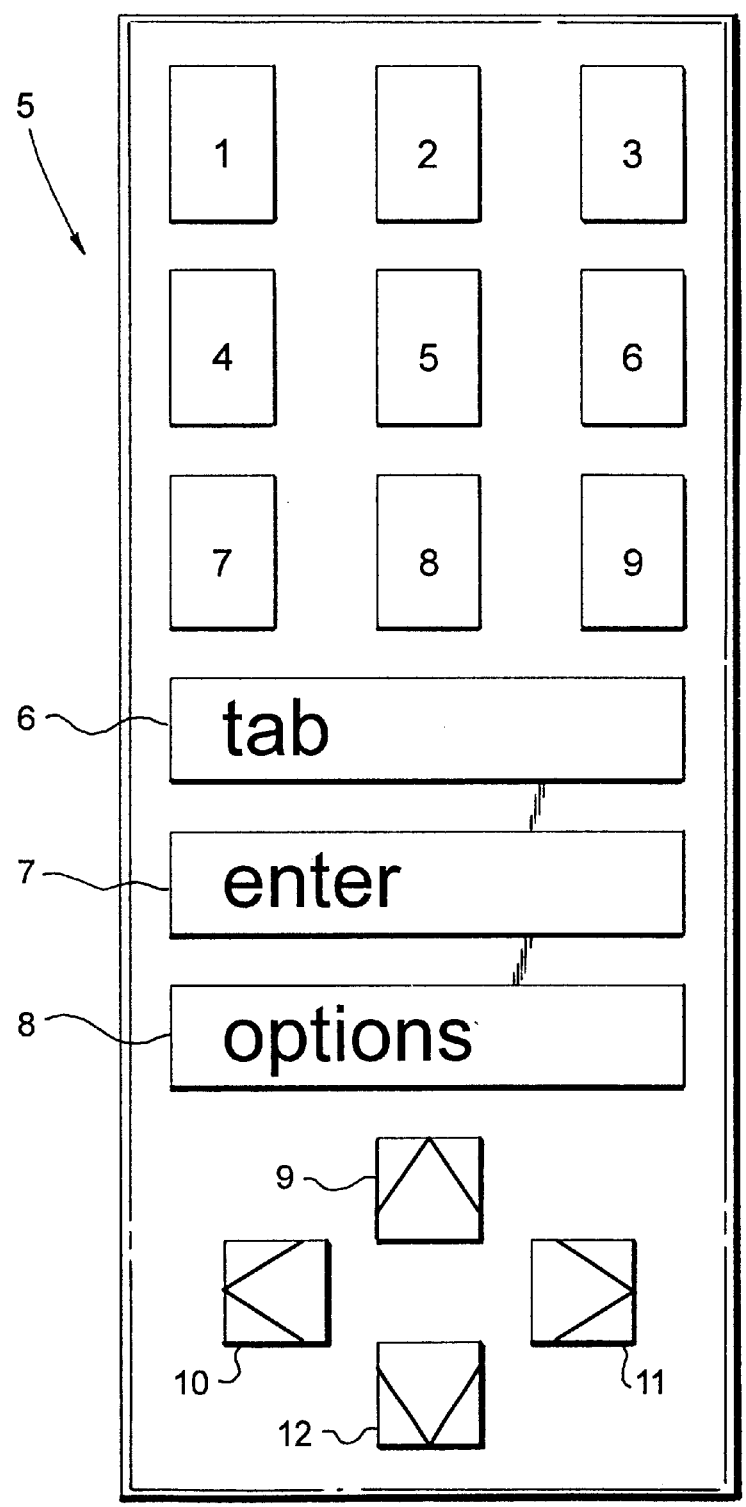
FIG. 3 shows a remote control unit for use in the implementation of this invention.

The same result, of changing the selection from a car 20 surrounded by the cursor 50 in frame 1 to a tree 40 surrounded by the cursor 50 in frame 2, could be obtained by pressing a right arrow key 11 (FIG. 3). The other arrow keys 9, 10, 12 (FIG. 3), are used similarly, to navigate the cursor to objects above, below, and to the sides of the object surrounded by the cursor 50 at that moment. Thus, the viewer navigates among hot spots through the use of the tab 6 (FIG. 3) or arrow keys 9, 10, 11, 12 (FIG. 3), and the cursor 50 moves among constrained on-screen hot spot locations.

As indicated at step 270 (FIG. 1), a function can be invoked and executed. Such functions may include the downloading of a data file associated with a product indicated by a hot spot and embedded in a MMP. To initiate execution, an enter button 7 (FIG. 3) on the remote control 5 (FIG. 3) is pressed. For example, by pressing the enter key 7 (FIG. 3) when the car 20 is surrounded by the cursor 50, as shown in frame 1, the viewer elects to execute the function, such as downloading a file or displaying a menu of available data, associated with this car 20.

Any unused key on the remote control 5 (FIG. 3) can be dedicated as an options key 8 (FIG. 3). This key is used to expand the functional options available to the viewer. As an example, instead of a single function, i.e., downloading a file, available to the viewer when the enter key 7 (FIG. 3) is pressed, the options key 8 (FIG. 3) may offer multiple functions, which the viewer can then navigate through using the navigation keys 6, 9–12 (FIG. 3) and select by pressing the enter key 7 (FIG. 3).

There are several options for the order in which hot spots are traversed, as the viewer presses the tab key. That order may be a fixed location order, such as top-to-bottom/left-to-right, originally embedded with hot spot properties in the MMP. The received pre-determined order may be varied in accordance with viewer's profile and/or preferences. The author can select an order based on considerations such as the importance of the function associated with the hot spot, and include this priority in the hot spot information. The priority of each hot spot can be considered its temperature, relative to the other hot spots which are active on the screen contemporaneously.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A method for enabling user interaction with multiple dynamic selectable regions in a broadcast multi media presentation, the method comprising:

receiving and decoding a video broadcast signal forming said multi media presentation, said video broadcast signal having embedded information indicating presence and on-screen locations of said multiple dynamic selectable regions in said broadcast multi media presentation, each said dynamic selectable region having functions associated therewith;

extracting said embedded information;

implementing a remote control for displaying an on-screen cursor capable of traversing said multiple dynamic selectable regions according to a viewer profile and in response to viewer input;

constraining the traversal of said on-screen cursor among said multiple dynamic selectable regions at locations specified in said extracted embedded information and, enabling selection of a dynamic selectable region via said remote control; and executing said associated functions in response to viewer selection of a dynamic selectable region via said remote control.

2. The method of claim 1, wherein said embedded information includes priorities related to said dynamic selectable regions, said method further including steps of extracting said priorities from said embedded information and storing said priorities in a viewer profile.

3. The method of claim 2, further including steps of updating said viewer profile according to frequency of execution of said functions.

4. The method of claim 3, further providing said dynamic selectable regions with a corresponding default priority ranging from high to low, displaying said on-screen cursor with said dynamic selectable region having said high priority.

5. The method of claim 4, wherein said on-screen cursor is moved sequentially according to said priorities in response to said viewer input, said sequential movement starting at said dynamic selectable region with said high priority and ending at said dynamic selectable regions with said low priority.

6. The method of claim 5, wherein said on-screen cursor is capable of moving up, down, left and right among said dynamic selectable regions independent of said priorities.

7. The method of claim 6, wherein said embedded information further includes a menu of sub__functions associated with a dynamic selectable region, said menu of sub-functions having static selectable choices and sub-functions associated with said static selectable choices.

8. The method of claim 7, further comprising steps of
displaying said menu of sub-functions in response to viewer input;
controlling the movement of said on-screen cursor among said static selectable choices; and
executing said sub-functions in response to viewer input.

9. The method of claim 8, wherein said viewer input is provided using an infrared remote control keypad.

10. A system for enabling user interaction with a broadcast multi media presentation having multiple dynamic selectable regions, the system comprising:

means for receiving and decoding a broadcast video signal forming said multi media presentation, said video broadcast signal indicating presence and on-screen locations of said multiple dynamic selectable regions in said broadcast multi media presentation, each said dynamic selectable region having functions associated therewith;

means for extracting said embedded information;

remote control device for displaying an on-screen cursor capable of traversing said dynamic selectable regions according to a viewer profile and in response to viewer input;

means for constraining traversal of said on-screen cursor among said dynamic selectable regions at locations specified in said extracted embedded information and, enabling selection of a dynamic selectable region via said remote control device;

means for executing said associated functions in response to viewer selection of a dynamic selectable region via said remote control.

11. The system of claim 10, wherein said embedded information further includes a menu of sub-functions associated with a dynamic selectable region, said menu of sub-functions having static selectable choices and sub-functions associated with said static selectable choices.

12. The system of claim 11, further comprising:
means for displaying said menu of sub-functions in response to viewer input;
means for controlling the movement of said on-screen cursor among said static selectable choices; and
means for executing said sub-functions in response to viewer input.

13. The means of claim 12, wherein said viewer input is provided using an infrared remote control keypad.

14. A computer program device readable by a machine, tangibly embodying a program of instructions executable by a machine to perform method steps for enabling user interaction with a broadcast multi media presentation having multiple dynamic selectable regions, the method comprising:

receiving and decoding a video broadcast signal forming said multi media presentation, said video broadcast signal having embedded information indicating presence and on-screen locations of said multiple dynamic selectable regions in said broadcast multi media presentation, each said dynamic selectable region having functions associated therewith;

extracting said embedded information;

implementing a remote control for displaying an on-screen cursor capable of traversing said multiple dynamic selectable regions according to a viewer profile and in response to viewer input;

constraining the traversal of said on-screen cursor among said multiple dynamic selectable regions at locations specified in said extracted embedded information and, enabling selection of a dynamic selectable region via said remote control; and executing said associated functions in response to viewer selection of a dynamic selectable region via said remote control.

15. The method of claim 14, wherein said embedded information further includes a menu of sub-functions associated with a dynamic selectable region, said menu of sub-functions having static selectable choices and sub-functions associated with said static selectable choices.

16. The method of claim 15, further comprising:
displaying said menu of sub-functions in response to viewer input;
controlling the movement of said on-screen cursor among said static selectable choices; and
executing said sub-functions in response to viewer input.

17. The method of claim 16, wherein said viewer input is provided using an infrared remote control keypad.

* * * * *